Figure 1:
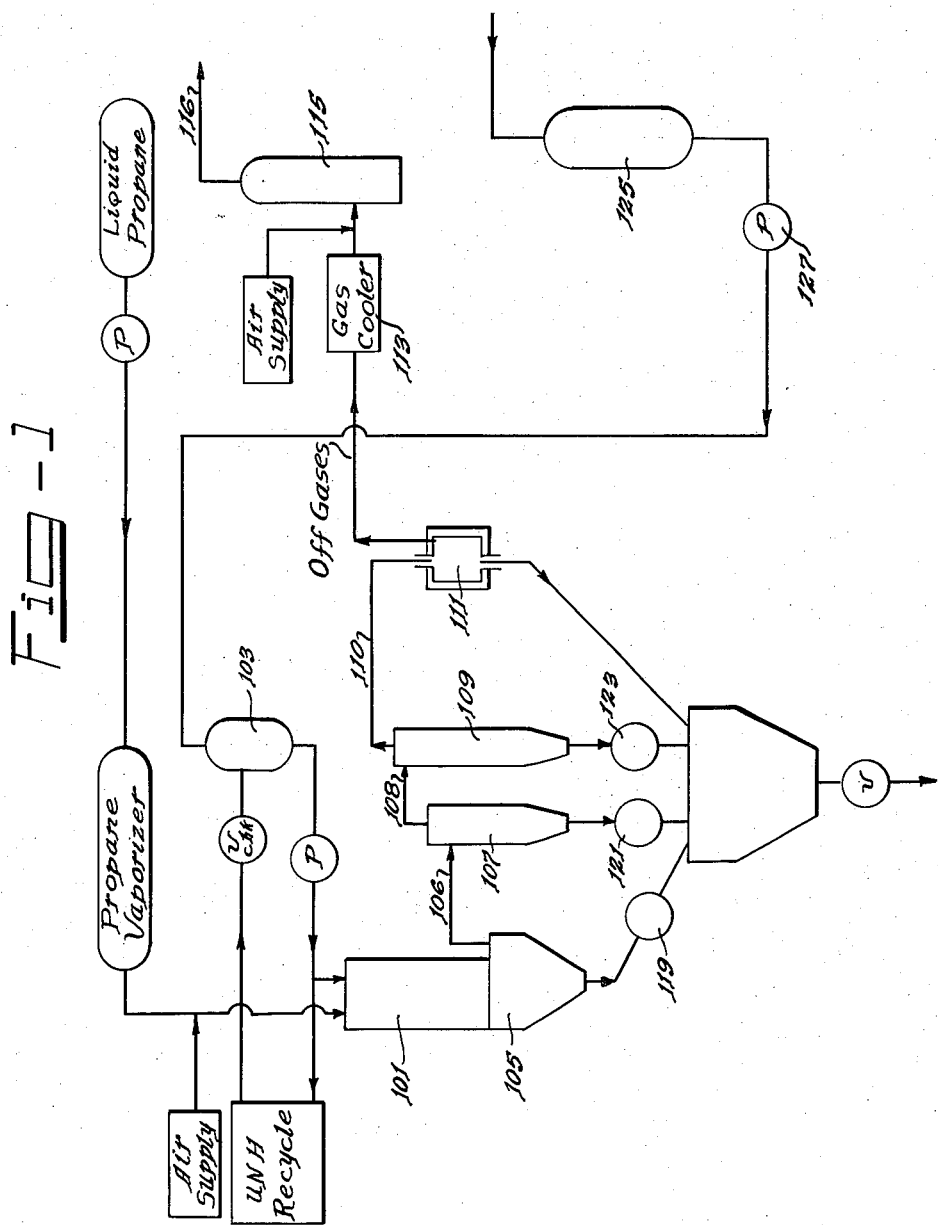

June 26, 1962

W. H. HEDLEY ETAL 3,041,136

FLAME DENITRATION AND REDUCTION OF URANIUM
NITRATE TO URANIUM DIOXIDE

Filed April 8, 1960

2 Sheets-Sheet 1

INVENTORS
William H. Hedley
Robert J. Roehrs
Courtland M. Henderson

By:

Attorney

United States Patent Office 3,041,136
Patented June 26, 1962

3,041,136
FLAME DENITRATION AND REDUCTION OF URANIUM NITRATE TO URANIUM DIOXIDE
William H. Hedley, Kirkwood, and Robert J. Roehrs, St. Louis, Mo., and Courtland M. Henderson, Xenia, Ohio, assignors, by mesne assignments, to the United States of America as represented by the United States Atomic Energy Commission
Filed Apr. 8, 1960, Ser. No. 21,071
5 Claims. (Cl. 23—14.5)

The present invention deals with a process for converting aqueous uranyl nitrate to uranium dioxide and an apparatus therefor. This process will hereafter be referred to as the "flame process." The term "aqueous uranyl nitrate" will be used to cover both uranyl nitrate hydrates and their solutions.

It is an object of the invention to accomplish the denitrification and reduction of aqueous uranyl nitrate in a single step, decreasing the costs of the operation substantially.

It is a further object of the invention to produce a uranium dioxide very well suited for conversion to uranium fluoride in that it reacts rapidly and completely with hydrogen fluoride to produce uranium tetrafluoride of very high purity. This tetrafluoride is a very important intermediate material for the production of uranium metal by reaction with calcium or magnesium. It is also a very useful intermediate in the production of uranium hexafluoride. This is the compound of uranium utilized in the diffusion process of enrichment in the isotope $U^{235}$.

It is also an object of this invention to produce uranium dioxide in a form that can be stored for long periods of time with substantially no deterioration by conversion to higher oxides through mere contact with air at ordinary temperatures. This occurrence would require further reduction before conversion could be made to the fluoride. Otherwise there would be contamination with oxyfluoride and other undesirable compounds.

Finally, it is an object of the invention to furnish an apparatus capable of converting aqueous uranyl nitrate to uranium dioxide smoothly, completely and continuously.

The present practice for converting aqueous uranyl nitrate to uranium dioxide normally requires three steps. The usual starting material is an aqueous solution, so the first step involves driving off sufficient water to form the molten hydrate. Next, sufficient heat is supplied to drive off the water of hydration and to decompose the uranium nitrate and obtain uranium trioxide. Finally, reduction to uranium dioxide is accomplished by passing either hydrogen or cracked ammonia through the heated trioxide. It is usual to perform each step in different equipment.

The denitrification step may take place in a fluidized bed or in a batch reaction vessel. Further, the hydrated salt may be passed onto a bed of trioxide previously formed by a screw or other mechanical device. The reduction also may be carried out either in a fluidized bed, in a mechanically agitated bed, or in a moving bed. It is also possible to carry out the reaction batchwise under static conditions using thin layers of the trioxide in a reaction vessel.

The invention herein described can accomplish all three steps in a single operation, but for economic reasons it is preferable to concentrate a uranium solution to the molten hydrate stage before the process of this invention is applied. Therefore, the preferred embodiment of this invention replaces only two steps of the usual process.

Figure 2:
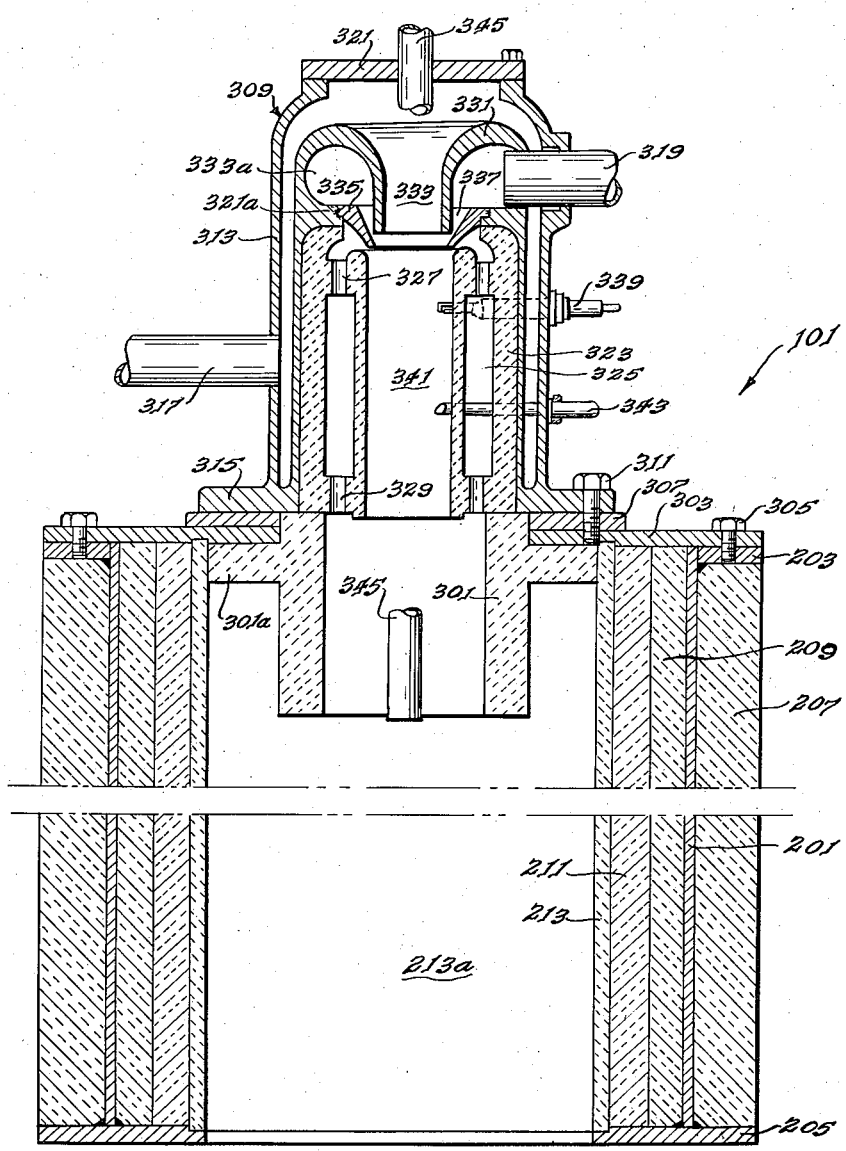

The equipment for one workable means for effecting this one step reaction and the flow sheet are shown in the following drawings wherein:

FIGURE 1 is a diagrammatic illustration of the apparatus; and
FIGURE 2 is a vertical sectional view of the reaction chamber proper.

Referring to FIGURE 1, the reaction chamber in which the dehydration, denitrification and reduction takes place is designated 101. A storage vessel for the aqueous uranyl nitrate is shown as 103. Positioned just below the reaction chamber 101 is the receiver 105. Cyclones 107 and 109, to remove solid products from the gases, are connected to the receiver 105 by pipes 106 and 108. A filter 111 is connected to cyclone 109 by pipeline 110. A gas cooler 113 is connected to the outlet of the filter 111. The outlet of the gas cooler 113 is connected to an absorber column 115 which communicates also to the atmosphere by pipe 116.

A rotary seal 119 communicates between the receiver 105 and a hopper 117. Similar rotary seals 121 and 123 connect the solid outlets of cyclones 107 and 109 to hopper 117. A boil down tank 125 is connected to transfer pump 127, thence to storage vessel 103.

In operation, a reducing flame is produced in the reaction chamber 101 by the incomplete combustion of a hydrocarbon gas such as propane. To obtain the reducing flame propane is burned in a deficiency of air. A flame in which there is supplied less than 70% of the theoretically required air to burn the propane is well suited to the process. Aqueous uranyl nitrate is admitted to the reaction chamber 101 from storage vessel 103. Some of the $UO_2$ produced drops into receiver 105; further amounts are separated from combustion gases by cyclones 107 and 109. The last traces of $UO_2$ are removed by the filter 111. The combustion gas then is cooled by the cooler 113 and nitric oxides absorbed in the absorber column 115 before the combustion gas exhausts to the atmosphere.

Referring to FIG. 2, a tubular shell 201 is 6 feet long and 34 inches in diameter. At the top of this shell an upper flange 203 is welded extending radially outward. Lower flange 205 is welded to the bottom of shell 201, extending radially outward and inward therefrom. The outer periphery of shell 201 is covered with pipe insulation 207. Inside of shell 201 are, in order, a first insulator layer 209, consisting of a layer of a few inches of a material of extra low thermal conductivity, such as high temperature service mineral wool blocks, a second insulator layer 211 consisting of a few inches of a material of low thermal conductivity such as fire brick or alumina bubbles, and an inner refractory layer 213, made up of 6 rings of silicon carbide, one on top of the other in longitudinal alignment, each ring having one edge concavely rounded and one edge convexly rounded. This construction is employed to retain alignment. All insulating layers and the pipe insulation are supported by lower flange 205. The inner layer 213 defines a reaction chamber 213a which is open at its bottom to and communicates with receiver 105 (see FIG. 1). A cylindrical flame throat 301 is located within the upper portion of chamber 213a and is provided with a flange 301a extending outwardly therefrom near the top of the throat. Throat 301 is coaxial with shell 201 and is formed from graphite. The top of the flange 301a is flush with the top of the shell 201. This throat 301 is secured to and supported from an annular plate 303 which rests on and is fastened to upper flange 203 by bolts 305 and extends from throat piece 301 to the edge of insulation 207. A smaller annular plate 307 rests on the larger plate 303 and is flush with the top of throat piece 301.

A burner assembly 309 comprises a double-walled metal cylinder 313 which has a lower flange 315 extending outwardly from the base thereof, and has an air inlet line 317 leading into the volume between the walls of shell 313; and a gas inlet line 319 passing through both walls of shell 313. The burner assembly 309 is secured to plates 303 and 307 by bolts 311 passing through flange 315. Both walls of shell 313 curve inwardly at the top. The outer wall of shell 313 is closed by cover 321. A flange 321a extends inwardly from the inner wall of shell 313 a short distance below the point at which it starts curving inwardly. Shell 313 is coaxial with shell 201.

A cylindrical body 323 having an annular recirculation chamber 325 therein and surrounding a flame channel 341 conforms closely to the inner wall of shell 313 between flange 321a and the bottom of shell 313. Ports 327 pierce the top of body 323 and ports 329 pierce body 323 at its bottom.

A funnel tube 331 has its top aligned with and connected to the incurved end of the inner wall of shell 313 and forms a venturi 333 for the entrance of air from air inlet 317. The funnel tube 331 forms with the upper incurving end of the inner wall of the shell 313 and the flange 321a a gas inlet chamber 333a which communicates with gas inlet line 319. A conical ring 335 aligned with and connected to flange 321a forms with funnel tube 331 an orifice 337 for the entrance of gas from inlet 319. Air ignition plug 339 passes through both walls of chamber member 323 into flame channel 341 and when activated ignites the air-gas mixture. The continuance of the flame in channel 341 is monitored by flame detector 343 essentially an ultraviolet sensitive device which penetrates into chamber 341. The function of chamber 325 is to allow the circulation of the hot combustion products to heat the combustion gases fed into chamber 341 and thus facilitate their combustion. A pneumatic atomizing liquid spray nozzle assembly 345 passes through cover 321 and flame channel 341 to enter the chamber 213a. Nozzle 345 is water cooled and insulated (details not shown). The burner is therefore built around the spray nozzle and the feed is introduced along the burner axis.

Propane, vaporized at 50 p.s.i.g. enters the apparatus through inlet tube 319; air enters through its inlet 317, also at 50 p.s.i.g. The gases ignite and pass into the chamber 213a through the area between chamber member 323 and the spray nozzle assembly 345. Meanwhile flame detector 343 detects the flame and releases a liquid through spray 345. At first the liquid is ordinary water, until a temperature in excess of 1500° F. is detected in the reaction chamber by a thermocouple (not shown). Then aqueous uranyl nitrate is admitted under pressure through a control valve (not shown). The droplets of aqueous uranyl nitrate enter the zone with the combustion gases, and are dried, denitrated and converted to $UO_2$ by the time they reach the bottom of the chamber. It has been found that with the pressures used, a length of about 6 feet is sufficient to complete the reaction.

The above-described unit is capable of converting aqueous uranyl nitrate to the dioxide in a single step, combining dehydration, denitrification and reduction. It is also capable of converting the molten hydrate to the dixoide in a single step. The properties of the uranium dioxide so produced are superior to those of the ordinary product, as will be shown later in the specification. The operation of the apparatus will now be described.

Prior to establishing a flame, nitrogen or other inert gas is used to purge the reaction chamber. The combustion mixture of gases is ignited by depressing a start button on the flame detection unit. This sends current to a spark plug-type ignition rod located in the combustion area and also energizes two solenoid valves, one in the propane line and one in the air line. Opening of these valves allows a predetermined mixture of propane and air to flow through the burner and ignite by means of the spark from the ignition rod.

During ignition, the electronic network of the flame detection system is bypassed for approximately 15 seconds. If the flame is not established within that time, the solenoid valve closes and can not be reopened for approximately 30 seconds. However, if the flame is established the detection system is engaged and holds the feed gas solenoid open as long as it detects a flame. An excess of propane is fed to the unit in order to simultaneously denitrate and reduce the uranyl nitrate to $UO_2$.

The flow of combustion gases is then increased to a desired level and the flame is maintained automatically. The feed system is constructed so that either water or aqeuous uranyl nitrate can be forced through the spray nozzle. Common practice is to flow water through the system prior to introducing aqueous uranyl nitrate. There are two reasons for doing so. First, the water keeps the nozzle from becoming overheated during the preheat cycle. Second, if the flow of water is allowed to increase to a flow rate equal to the anticipated flow of the aqueous uranyl nitrate, the unit will approach an equilibrium condition and therefore the temperature in the unit will not drop when the nitrate is introduced. Aqueous uranyl nitrate is not allowed to flow until the temperature of the exit gases at the bottom of the reactor has reached approximately 1800° F. This temperature is experimentally determined as being sufficient for denitration and reduction of uranyl nitrate to $UO_2$. It is measured with a sheathed chromel-alumel thermocouple.

In this process, denitration must take place almost instantly, but reduction to $UO_2$ of the powder formed takes place only as the particles travel down the length of the reactor. This was demonstrated by some early pilot scale runs with inadequate reduction in which the product consisted predominantly of nitrate free $U_3O_8$. It is believed that there are four main factors which affect the conversion of aqueous uranyl nitrate to $UO_2$ by the flame process. They are droplet size, gas temperature, reducing power of gases and residence time. Early experiments resulted in $U_3O_8$ as a product when using a liquid droplet size of about 40 microns or less, a generous excess of propane, an exit gas temperature of 1800° F. and a reaction chamber four inches in diameter by one foot long. Since the use of small particle size, excess propane and high gas temperature alone did not produce $UO_2$, it was decided that increased residence time in the reactor would be tried. Another reaction chamber three feet long and five inches in diameter was therefore constructed. Operating with this longer chamber at the same gas and the liquid flow rates used previously, it was possible to produce $UO_2$ routinely with exit gas temperatures of approximately 1800° F. In the apparatus used introduction of the feed parallel to the burner axis is also important. Trial runs were made employing nozzles which directed the spray into the flame in a direction perpendicular to the flame. In these runs the water was not all evaporated before it hit the opposite wall.

In order to prevent freezing of the aqueous uranyl nitrate in the lines, a dilute liquid containing only 4.3 pounds of U/gallon (approximately 50 w/o uranyl nitrate) has been used as the feed for most of the runs. However, three runs have been made using concentrated liquid containing 12.0 to 13.0 pounds of uranium per gallon (uranyl nitrate hexahydrate contains 9.75 lbs. U/gal.).

This equipment and process has been found capable of using solutions of uranium nitrate containing up to 13 pounds of uranium per gallon. The preferred concentration is the highest concentration which can be used without plugging the nozzle, because this lowers the propane consumption per pound of uranium processed, and also the off-gases from the process will be richer in byproduct nitrogen oxides which will make their recovery easier. The apparatus described is able to handle 160 gal./hr. of the 10 lbs. of U/gal. liquid. Heating and reduction of this quantity requires 380 pounds of propane and 6880 cu. ft. of 100 p.s.i.g. air per hour. This produces a product $UO_2$ having unexpectedly desirable properties.

In evaluating the product obtained by the flame process, both chemical and physical properties have been rather exhaustively investigated.

EXAMPLE

A series of runs were made in the pilot scale apparatus with a 3 foot chamber length and an exit gas temperature approximately 1800° F. During these runs aqueous uranyl nitrate was used in a concentration ranging from 4.2 to 13.0 lbs. uranium per gallon. Aqueous uranyl nitrate containing 12.9 lbs. U/gal. was smoothly converted to $UO_2$ at the rate of 35.0 pounds of uranium per hour, using 0.225 pound of propane per pound of uranium. Several batches were selected for tests. Since a large number of tests were to be made and the tests were lengthy, the tests were not repeated on every batch. Comparisons were made in each case with available $UO_2$ made by other processes.

TABLE I

[Chemical Analysis]

| Oxide source | Percent $U^{+4}$ | Percent free $UO_2$ | Percent $NO_3$ | Percent $H_2O$ |
|---|---|---|---|---|
| Flame process (batch D-22) | 85.6 | 95.7 | <0.1 | <0.03 |
| Mallinckrodt fluid bed product | 80.9 | 88.1 | <0.1 | <0.6 |

In both cases efforts were made to cool the sample to room temperature before exposing it to air. Because it is difficult to get a sample analyzed without oxidation occurring, 95% free $UO_2$ is among the highest percentages ever analyzed. $UO_2$ used to make $UF_4$ in a completely enclosed, leakproof system would probably undergo less reoxidation.

*Stability of flame process $UO_2$ against atmospheric oxidation.*—Samples of flame process $UO_2$, in layers less than ⅛ inch thick, were placed in open bottles and left exposed to the atmosphere for varying lengths of time. The results are shown in Table II.

TABLE II

*Stability of Flame Process $UO_2$ Against Atmospheric Oxidation*

[Oxide Source: Flame Process Run 12]

| Time in weeks exposed to air at room temperature | Percent $U^{+4}$ | Percent free $UO_2$ |
|---|---|---|
| 2 | 83.3 | 91.9 |
| 5 | 83.2 | 91.7 |
| 11 | 81.9 | 89.6 |

The amount of free $UO_2$ in the samples at time zero is uncertain, but is known to have been less than 95%. This is believed to fall short of a 100% $UO_2$ product by reason of incomplete protection in the experimental apparatus during original cooling. The oxidation which took place on standing was not excessive even under these very adverse conditions. In plant practice it would not be necessary to expose $UO_2$ as thoroughly or for such long periods as this, and thus the amount of oxidation which would take place under these circumstances should be considerably less.

*$UO_2$ trace impurities.*—Samples of flame process $UO_2$ and Weldon Spring plant fluid bed $UO_2$ were analyzed spectrographically. The results of this analysis are listed below:

TABLE III

*Spectrographic Analysis for Trace Impurities in $UO_2$*

| | Flame process (p.p.m.) (Run D-15) | Fluid bed (p.p.m.) |
|---|---|---|
| Ag | 4 | <0.1 |
| Al | 10 | <10 |
| As | <10 | <10 |
| B | <0.10 | <0.10 |
| Be | <0.10 | <0.1 |
| Bi | <1 | <1 |
| Co | 4 | <1 |
| Cr | <1 | 15 |
| Cu | 15 | <1 |
| Fe | 15 | 60 |
| In | <0.5 | <0.5 |
| Mg | 30 | 20 |
| Mn | <10 | <10 |
| Mo | <10 | <10 |
| Ni | 4 | 10 |
| P | 20 | 20 |
| Pb | 20 | <1 |
| Sb | <2 | <2 |
| Si | 20 | 70 |
| Sn | 3 | <1 |
| V | <20 | <20 |
| Zn | 70 | <50 |

The differences in concentration of impurities in these two samples are small in most cases. Those elements that appear to be higher in the flame process material (such as Cu and Zn) are probably derived from components of the experimental apparatus that require further engineering design.

The flame process $UO_2$ contains considerably less than the 100 p.p.m. iron and 75 p.p.m. nickel which are the only limits for green salt. Trouble is not anticipated with any of the trace elements in this process.

*Reactivity with hydrogen fluoride.*—Table IV shows the HF concentrations, reaction completion times, and reaction temperatures used for laboratory hydrofluorination evaluation of various oxide samples. All data listed in this section were obtained from runs in a thermobalance.

TABLE IV

*Reactivity With Hydrogen Fluoride*

| Oxide | Concentration HF, w/o | Hydrofluorination reaction | |
|---|---|---|---|
| | | Completion time, mins. | Reaction temp. °C. |
| Flame process $UO_2$ | 100 | 7 | 396–398 |
| Flame process $UO_2$ | 67 | 22 | 390–392 |
| Flame process $UO_2$ | 32 | 55 | 398 |
| Fluid bed $UO_2$ | 100 | 36 | 402–405 |
| Flame process $UO_2$ | 100 | <0.7 | 495 |
| Fluid bed $UO_2$ | 100 | 7 | 504–510 |
| Controlled pot $UO_3$ (laboratory reduced to $UO_2$) | 100 | 22 | 498–501 |
| Fluid bed $UO_3$ (laboratory reduced to $UO_2$) | 100 | 33 | 506–509 |

As shown in Table IV, the reactivity of flame process material with either anhydrous HF or 70% HF is exceptionally good. Times for complete reaction for several runs with this material have ranged from 7 to 13 minutes using anhydrous HF at 400 C. The reactivity of the fluid bed $UO_2$ is considered to be an average value for plant material run at 400° C.

The extreme reactivity of flame process material is greatly emphasized by noting its lower completion time with 70% HF when compared with that of fluid bed $UO_2$ that was treated with anhydrous HF. The 32 w/o HF run with flame process $UO_2$ shows that this material can utilize HF in almost any concentration, and that it should be compatible with the low excess HF process change being installed in the Weldon Spring plant, thus insuring the lowest possible raw materials cost for hydrofluorination.

*Green salt properties.*—Samples of flame process $UO_2$ and $UO_2$ from standard pot $UO_3$ were hydrofluorinated with 100 w/o HF at several different temperatures. The analyses of the green salt produced are listed in Table V.

TABLE V

*Green Salt Properties*

| Hydrofluorination temp. ° C. | | Flame AOI percent | Process $UO_2$ W.S.,[1] percent | (Run D 22) U+4, percent | $UO_2$ from std. pot $UO_3$ | | |
|---|---|---|---|---|---|---|---|
| Peak | Level | | | | AOI, percent | W.S., percent | U+4, percent |
| 458 | 422 | 0.08 | 3.71 | 73.0 | 0.83 | 2.77 | 73.8 |
| 535 | 510 | 0.05 | 3.57 | 73.1 | 0.38 | 2.70 | 73.8 |
| 568 | 530 | 0.06 | 2.38 | 74.0 | 0.08 | 4.37 | 72.5 |
| 605 | 575 | 0.06 | 3.18 | 73.4 | 0.28 | 4.59 | 72.4 |
| 628 | 602 | 0.08 | 2.26 | 74.1 | 0.24 | 2.55 | 73.9 |
| 660 | 647 | 0.21 | 1.35 | 74.8 | 0.21 | 3.99 | 72.8 |
| 730 | 722 | 1.50 | 1.66 | 75.1 | 2.67 | 4.26 | 72.9 |
| 755 | 755 | 7.00 | 1.50 | 75.6 | 17.7 | 5.12 | 74.1 |

[1] W.S. means water soluble and indicates $UO_2F_2$; AOI means ammonium oxalate insoluble and indicates unconverted oxide. Uranium tetrafluoride is often called green salt.

The analyses show that low AOI green salt can be produced on a laboratory scale from both materials at temperatures up to 660° C. In the hydrofluorinations at temperatures of 722° C. and above, the AOI's increased due to thermal damage of the oxide. The flame process $UO_2$, however, was less sensitive to thermal damage than was the standard material used for comparison. This seems reasonable because powders composed of small particles tend to be less susceptible to thermal damage. The material chosen for comparison is standard pot $UO_3$ which has been laboratory reduced to $UO_2$. The indicated lower susceptibility of flame process $UO_2$ to thermal damage could be of real advantage in production by reducing the number of lots of green salt rejected for high AOI.

The $UO_2$ samples used in these runs contained relatively large amounts of $U_3O_8$, probably due to partial reoxidation of $UO_2$ which had been exposed to the atmosphere before complete cooling. The presence of this $U_3O_8$ accounts for the relatively high water soluble contents of the low temperature runs as compared with plant green salt.

*Physical properties.*—The physical properties of the flame process product to be discussed include $UO_2$ X-ray analyses, $UO_2$ particle size, densities of cold pressed and sintered $UO_2$ compacts, $UO_2$ surface area, and tap density.

*$UO_2$ X-ray analyses.*—X-ray analysis has been used to determine the unit cell size, the strain, and the crystallite size for flame process $UO_2$ and for fluid bed $UO_2$. These values are listed in Table VI.

TABLE VI

*$UO_2$ X-Ray Analysis*

| | Flame process $UO_2$ (Run D-22) | Fluid Bed $UO_2$ |
|---|---|---|
| Unit cell size A | 5.4684 | 5.468 |
| Strain, dimensionless | None | 0.055 |
| Crystallite size A | 1,150 | 800 |

The unit cell size of both flame process $UO_2$ and fluid bed $UO_2$ are the same within the limits of measurement. The composition of the main phase of the flame process $UO_2$ can definitely be established as being between $UO_{2.00}$ and $UO_{2.01}$, probably closer to $UO_{2.00}$.

A statistical analysis of the X-ray data shows that the strain trapped in the lattice of flame process $UO_2$ is not different from zero within 95% confidence limits. Based on this same analysis, the crystallite size is 1150±100 angstrom units within 95% confidence limits.

*$UO_2$ particle size.*—The Micromerograph particle size distribution of $UO_2$ produced by various methods is shown in Table VII.

TABLE VII

*Particle Size Distribution by Micromerograph*

| Oxide source | Diameter equal to or less than [1] | | |
|---|---|---|---|
| | 95% | 50% | 5% |
| | Microns | Microns | Microns |
| Flame process (Run D-15) | 6.5 | 2.3 | 0.86 |
| Micronized high fired | 5.5 | 1.8 | 0.54 |
| Fluid bed | >100 | 46 | 2.5 |
| High fired | >100 | 44 | 4.5 |

[1] This signifies, for example, that 50% of Run D-15 $UO_2$ has a particle size equal to or smaller than 2.3μ.

The above data show that flame process $UO_2$ has virtually the same particle size distribution as high fired micronized material. The fluid bed $UO_2$ and the high fired $UO_2$ have very nearly the same particle size distributions, but both are much larger than those of micronized or flame process $UO_2$. The particle size distribution of flame process $UO_2$ has been nearly constant for all runs checked, with approximately 99 w/o of the material having a diameter between ½ and 10 microns.

The average particle sizes of the same types of powder as determined by Fisher Sub-Sieve Sizer are listed below:

TABLE VIII

*Average Particle Size as Determined by Fisher Sub-Sieve Sizer*

Oxide source:             Average particle size in microns
- Flame process (Run D-22) —————— 0.93
- Micronized high fired —————— 0.60–1.08
- Fluid bed —————— 2.43
- High fired —————— 4.05

The results of these particle size measurements substantiate the conclusions drawn from Micromerograph measurements.

*Densities of cold pressed and sintered $UO_2$ compacts.*—Samples of several types of $UO_2$ were cold pressed to form pellets which were fired under a hydrogen atmosphere. The results listed in Table IX compare the densities of the pellets produced with the maximum theoretical density of $UO_2$ (10.97 grams per cubic centimeter) and are the highest attained by this method for each powder, at the conditions listed.

The flame process, the micronized high-fired and the standard Weldon Spring fluid-bed pellets were all fabricated and fired by the same procedure; therefore, their densities should be directly comparable.

The high-fired screw-reactor powder which had not been micronized was not fired as long nor at as high a temperature as the other samples. A longer, higher-temperature firing of the material would be expected to increase the density of the product slightly, but not to the extent that it would equal the micronized screw-reactor material, or flame-process material. The pellets evaluated were cylindrical in shape (0.4" in diameter by 0.4" high).

TABLE IX

*Densities of cold pressed and sintered $UO_2$ compacts.—*

| Oxide source | Firing time hours | Firing temp.[1] ° C. | Compaction pressure tons/ sq. in. | Percent of max. theoretical density |
|---|---|---|---|---|
| Flame process | 20 | 1,700 | 50 | 96.1 |
| Micronized high-fired screw reactor | 20 | 1,700 | 50 | 95.1 |
| Standard Weldon spring fluid-bed | 20 | 1,700 | 50 | 92.2 |
| High-fired screw reactor (no micronizing) | 16 | 1,635 | 100 | 91.7 |

[1] The temperatures listed were obtained by means of an optical pyrometer which had been sighted on the molybdenum boat in which the pellets were fired.

Pellets produced from flame process $UO_2$ are slightly more dense than those produced from micronized high fired $UO_2$ and yet did not require the further expensive particle size reduction.

The cost of micronizing one ton of $UO_2$ at a rate of 25 pounds per hour has been estimated at $1,466.26. While this cost might be lowered considerably if the rate could be increased to 50 or 75 pounds of $UO_2$ per hour, the cost of micronizing would still be many times larger than the flame process cost of converting uranyl nitrate liquor to $UO_2$. This cost could be completely saved in cases where flame process $UO_2$ could be successfully substituted for micronized $UO_2$ in ceramic applications.

$UO_2$ *surface area.*—Table X shows the surface area of several $UO_2$ powders.

TABLE X $UO_2$ Surface Area

| Oxide source: | BET surface area sq. meters/gram |
|---|---|
| Flame process (Run D–22) | 2.6 |
| Fluid bed | 3.14 |
| Normal screw | 1.38 |
| High fired | 0.57 |
| Micronized high fired | 2.19 |

The surface area (as determined by the BET krypton method) is approximately 2.6 square meters per gram for the three samples of flame process $UO_2$ evaluated thus far. The value determined for the fluid bed $UO_2$ is slightly higher than that of flame process $UO_2$ even though its agglomerates are much larger than those of the flame process material. This is probably due to a large amount of surface area inside the fluid bed $UO_2$ agglomerates, but the reason why fluid bed $UO_2$ reacts so much more slowly than flame process $UO_2$ is unknown.

*Tap Density*—(*a*)—$UO_2$.—The tap densities of several types of $UO_2$ are listed in Table XI.

TABLE XI $UO_2$ Tap Density

| Oxide source: | Tap density, g./cc. |
|---|---|
| Flame process | 1.5–3.6 |
| Fluid bed | ~4.5 |
| Micronized high fired | 2.74–3.50 |
| High fired | 4.3–4.42 |

These numbers express the range of values which have been obtained for each material. The tap densities of the recently produced flame process $UO_2$ have all been at the high end of the range listed. In recent experiments, it has been possible to raise the tap density of flame process $UO_2$ by changing operating conditions, and it is believed that the upper limit has not yet been reached for this material.

(*b*)—$UF_4$.—Green salt was prepared by hydrofluorinating flame process $UO_2$ with 100 w/o HF batchwise in a laboratory furnace. The range of tap densities for this material and for plant $UF_4$ are listed below:

TABLE XII

Tap Density of Green Salt

| Green Salt Source: | Tap density of $UF_4$, gms./cc. |
|---|---|
| Flame Process $UO_2$ (laboratory hydrofluorinated to $UF_4$) | 1.7–2.3 |
| Screw Reactors | 3.1–3.8 |

The recent values of tap density for flame process material have been at the high end of the range quoted. However, as in the case of tap density for flame process $UO_2$, this is not considered to be the maximum attainable value.

Further experiments have been made in which thorium nitrate, thorium-uranium (5 weight percent uranium) nitrate and aluminum nitrate solutions have been treated by this flame process. Analytical results are not yet available, but X-ray analysis indicates that the product from thorium nitrate is $ThO_2$ with no other phases detected.

It will be understood that this invention is not to be limited to the details given herein, but that it may be modified within the scope of the appended claims. In particular the apparatus portion of the invention is not limited to the device described in detail. For example, it may be desirable to use multiple spray nozzles operating parallel to each other; it might also, under some circumstances, be advantageous to spray countercurrent to the hot combustion gases. High pressure would be required to form liquor droplets of sufficiently small size with a pressure atomizing nozzle, but a pneumatic atomizing nozzle could eliminate this need for high pressure.

In general an apparatus for the process must include, for satisfactory operation:

(1) A feed system;
(2) An insulated tubular reactor;
(3) A spray nozzle positioned parallel to the axis of the reactor;
(4) A burner for continuously burning a fuel gas-air mixture with less than the stoichiometric amount of air to produce hot reducing gases;
(5) An ignition system;
(6) A flame detection system;
(7) Devices for collecting the products.

It is intended that the invention include all variations in methods of assembling the apparatus.

What is claimed is:

1. A process for converting uranyl nitrate solution to uranium dioxide comprising spraying fine droplets of aqueous uranyl nitrate solution into a high temperature hydrocarbon flame, said flame being deficient in oxygen approximately 30%, retaining the feed in the flame for a sufficient length of time to reduce the nitrate to the dioxide, and recovering uranium dioxide.

2. A process according to claim 1 wherein the reducing flame is formed by air and an excess of propane.

3. A process according to claim 2 wherein the feed is introduced axially of the flame.

4. A process according to claim 3 wherein the flame is maintained at such a temperature that the temperature of the exit gases is at least 1800° F.

5. A process according to claim 4 wherein the droplets of aqueous uranyl nitrate solution are no greater than 40 microns in diameter.

References Cited in the file of this patent

UNITED STATES PATENTS

| 2,267,720 | Cyr | Dec. 30, 1941 |
| 2,613,137 | Hellwig | Oct. 7, 1952 |
| 2,735,745 | Flook et al. | Feb. 21, 1956 |
| 2,737,445 | Nassen | Mar. 6, 1956 |
| 2,757,072 | Kapp et al. | July 31, 1956 |
| 2,761,767 | Perieres | Sept. 4, 1956 |
| 2,903,334 | Buckingham | Sept. 8, 1959 |

FOREIGN PATENTS

| 661,685 | Great Britain | Nov. 28, 1951 |
| 707,389 | Great Britain | Apr. 14, 1954 |

OTHER REFERENCES

Ser No. 379,872, Ebner (A.P.C.), published Apr. 27, 1943.

Katz: "The Chemistry of Uranium," 1st edition, pages 303, 304, 307, McGraw-Hill Book Co., New York, N.Y. (1951).

Johnson et al.: "Ceramic Bulletin," vol. 36, No. 3, page 116 (1957).

MCW–1429, pages 57–75, May 1, 1959.

Hedley et al.: MCW–1451, pages 19–24, Aug. 1, 1960.